Figure 1:
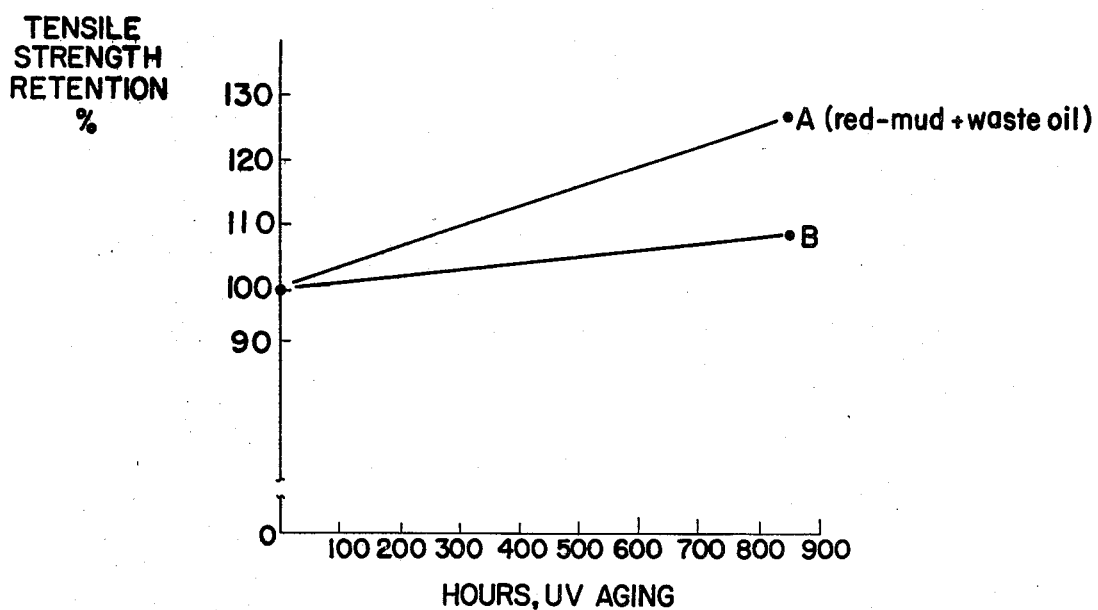

United States Patent [19]

Hao et al.

[11] 4,161,465

[45] Jul. 17, 1979

[54] PVC RED-MUD COMPOSITIONS

[75] Inventors: Paul L. C. Hao; Horng S. Tang; Wei W. Hsu, all of Hsinchu, Taiwan

[73] Assignee: Industrial Technology Research Institute, Taiwan

[21] Appl. No.: 816,668

[22] Filed: Jul. 18, 1977

[51] Int. Cl.$^2$ .................. C08K 3/22; C08L 27/06
[52] U.S. Cl. ..................... 260/2.3; 260/33.6 UA; 260/17.4 CL; 260/42.49
[58] Field of Search ............ 260/33.6 UA, 42.49, 260/2.3, 17.4 CL

[56] References Cited

U.S. PATENT DOCUMENTS

| | | | |
|---|---|---|---|
| 2,640,035 | 5/1953 | Brown et al. | 260/2.3 |
| 2,899,398 | 8/1959 | Pflaumer | 260/42.49 |
| 3,567,660 | 3/1971 | Winkler | 260/2.3 |
| 3,631,131 | 12/1971 | Kopko | 260/2.3 |
| 3,687,873 | 8/1972 | Kropscott et al. | 260/2.3 |
| 3,786,011 | 1/1974 | Price et al. | 260/42.49 |
| 3,836,504 | 9/1974 | Morisawa | 260/42.49 |
| 4,031,061 | 6/1977 | Thomas | 260/42.49 |

FOREIGN PATENT DOCUMENTS

| | | | |
|---|---|---|---|
| 48-29848 | 9/1973 | Japan | 260/2.3 |
| 475373 | 9/1973 | U.S.S.R. | 260/42.49 |

OTHER PUBLICATIONS

Chemical Abstracts, vol. 74, No. 18, May 3, 1971, p. 88728e.
Chemical Abstracts, vol. 75, No. 20, Nov. 15, 1971, P. 120921w.
Chemical Abstracts, vol. 83, No. 20, Nov. 17, 1975, p. 165414q.
Chemical Abstracts, vol. 85, No. 12, Sep. 20, 1976, p. 79883b.

*Primary Examiner*—Ronald W. Griffin
*Attorney, Agent, or Firm*—Robert I. Pearlman

[57] ABSTRACT

This invention relates to the production of a plastic material from new or waste polyvinylchloride (PVC) compounds with waste red-mud. The compositions may preferably also contain used machine lubricating oil. The degradation products in the PVC are neutralized by the free alkalies in the red-mud. The plastic material may also contain other additives, such as fillers and plasticizers to obtain desired physical properties.

10 Claims, 4 Drawing Figures

PVC RED-MUD COMPOSITIONS

BACKGROUND OF THE INVENTION

Waste red-mud is the residual product of the aluminum industry. It is obtained from Bauxite after the extraction of aluminum oxide with alkali solution. Since the residue still contains about 10% alkali, the disposal of red-mud may pollute the environment. A typical sample of the red-mud has shown the following analysis:

| | | | |
|---|---|---|---|
| $SiO_2$ | 14.6% | $TiO_2$ | 7.2% |
| $Al_2O_3$ | 22.6% | $Fe_2O_3$ | 35.6% |
| $Na_2O$ | 9.1% | Others | 10.9% |

The composition will vary depending upon the purity of the ore, type and concentration of alkali, type of extraction process, efficiency of extraction, etc. The foregoing analysis is for demonstration purposes only and is not meant to limit the composition of the red-mud.

The disposal of waste PVC has proven to be an environmental problem. Burning the material produces smoke and hazardous gases such as HCl. The present invention reduces these problems. The processes of the present invention utilize the convenience of the Banbury mixer, but other processing equipment can be used such as internal mixers, roll mills, extruders or other processing equipment familiar to those skilled in the art.

SUMMARY OF THE INVENTION

A plastic material is obtained by compounding polyvinylchloride (PVC) in the form of waste material or as fresh plastic, with waste red-mud. Preferably another waste product such as waste motor oil is added as an inexpensive processing aid thereby performing a worthwhile function while also eliminating a pollution problem. The waste oil softens the PVC while mixing to aid in the dispersion of ingredients, e.g. cut down power consumption, shorten mixing time, etc.

Di-octyl phthalate is another optional ingredient. It serves as a plasticizer to soften the PVC so that it will be flexible.

The following tables show the percentages of ingredients found in the present compositions. All percentages are on a weight percent basis.

Table 1

| INGREDIENT | Percent Ranges BROAD RANGE | PREFERRED RANGE |
|---|---|---|
| Red-mud | 5%–80% | 10%–55% |
| Waste oil | 0%–20% | 3%–15% |
| Di-octyl Phthalate | 0%–50% | 5%–10% |
| Other Filler | 0%–20% | 0%–6% |
| PVC | 20%–85% | 25%–80% |

TABLE 2

| INGREDIENT | Optimum Compositions HARD (Shore D-78) | SOFT (Shore A-77) |
|---|---|---|
| PVC | 20–30% (25%) | 30–50% (40%) |
| DOP | <10% (7%) | 20–40% (38%) |
| Red-mud | >30% (60%) | 5–25% (12%) |
| Waste Oil | 3–10% (4%) | 3–10% (5%) |
| Others | 2–6% (4%) | 2–6% (5%) |

Fillers such as designated below may be used in amounts of up to 20% to increase tensile strength and hardness. Cheap material byproducts, products, such as plant fibers, e.g. sisal, bagasse are preferred.

| Plant Fibers | Synthetic Fibers |
|---|---|
| Sisal | Glass |
| Bamboo | Polyester |
| Bagasse | Polyamide |
| | Polyvinylalcohol |
| | Polyacrylics |

Typically, the present compositions are non-transparent, heat stable to 180° C., and self extinguishing from a flammability standpoint. Typical hardnesses are Shore D-78 for hard materials and Shore A-77 for soft material compositions. Compounded material shows good outdoor stability.

DRAWINGS

Figure 2:
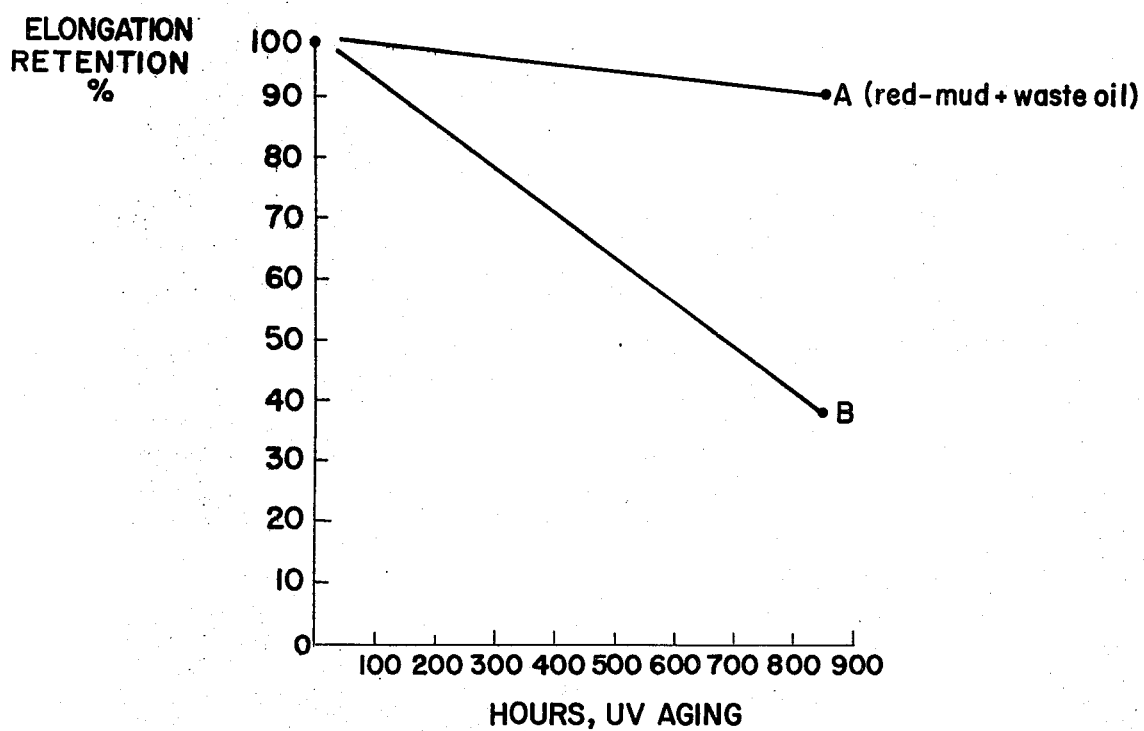

FIGS. 1 and 2 compare the results of adding red-mud to compositions not containing red-mud.

Figure 3:
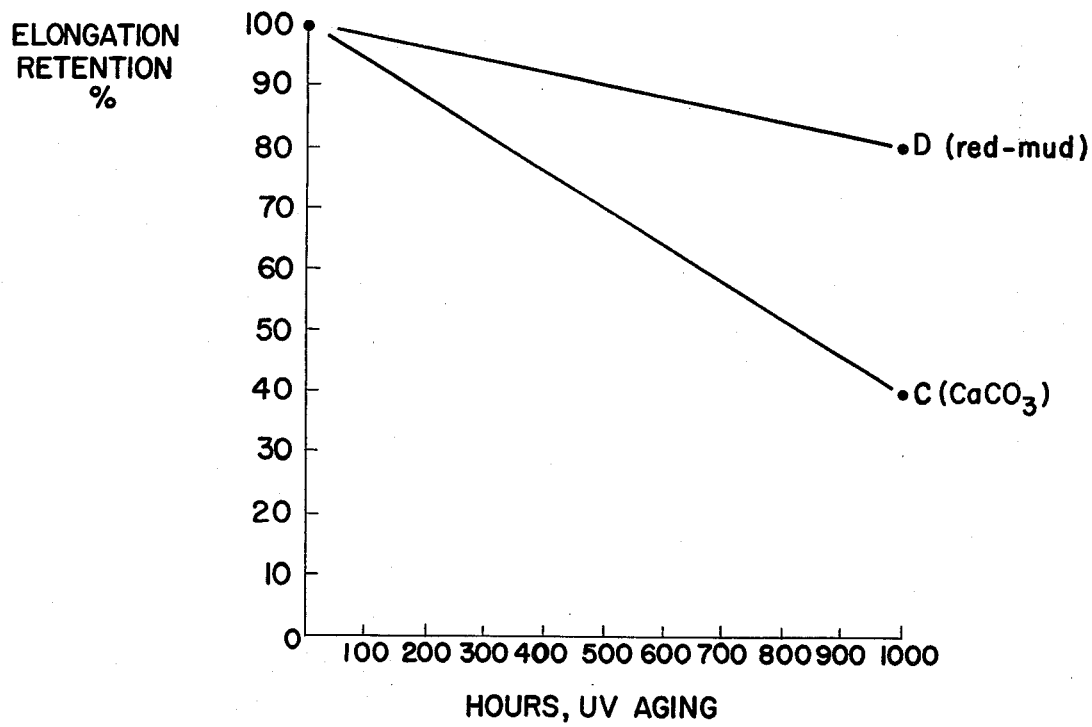
Figure 4:
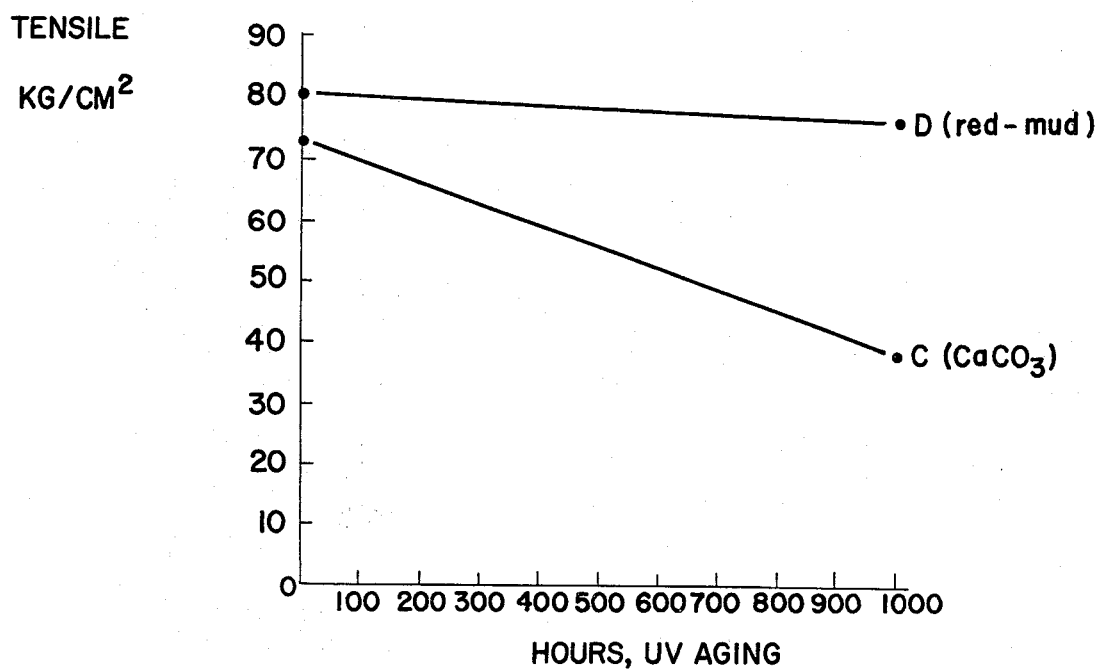

FIGS. 3 and 4 compare the present compositions with those employing $CaCo_3$ rather than red-mud.

The processes of the present invention provide a novel, highly effective method for the conversion of used lubricating oil, waste red-mud and new or waste PVC material into useful and durable products. Since all of the raw materials employed may be waste materials, this will reduce the cost of the products as well as reduce the waste disposal problems and ensuing environmental pollution. The current state of the art for the compounding of PVC uses costly stabilizers and processing aids. The present invention utilizes the stabilizing properties of the red-mud and the softening effect of the waste oil in PVC materials. The present invention reduces both the cost of the product and increases the thermal stability and weather resistance. Another advantage of the present invention is that compounded PVC material maintains a large amount of the initial tensile strength and elongation upon prolonged exposure to Ultraviolet irradiation. These effects may be due to the existence of the red-mud increasing the thermal stability of the compounded material by absorbing the resulting degradation products.

The compounded material may be formed into films, sheets, leathers, plates, etc. either of a flexible or hard type. The flexible material can be made into waste digesters, portable rice warehouses, fermentation vessels, containers for agricultural water, storage silos for grass and hay, hot bed liners, storage tanks for methane generated from animal wastes, liners for salt water evaporators and reservoirs, outside storage building, liners to protect beaches from wave action, wire and cable protective coatings, etc. The hard material can be used for durable conduits, corrugated roofing and siding, surfacing material for pedestrian sidewalks, construction panels, etc.

When waste PVC is used in the compositions of the present invention, it is often not necessary to add a plasticizer, since the waste PVC already contains plasticizer. Another advantage of the present invention is that compounded materials are self-extinguishing when subjected to a flammability test. This test consisted of igniting the compounded material with a bunson burner; when the bunson burner was removed, the burning of the material ceased. Yet another advantage of the present invention is the incorporation of waste and/or used machine, engine or motor lubricating oil as a processing aid with no adverse effect on the quality of the final product or its response to environmental aging. The addition eliminates costly processing oils and reduces the pollution caused by dumping the used oil.

In the following examples, the following standard test procedures were used:

| | |
|---|---|
| Aging | ASTM D 1573-61 |
| Tensile and Elongation | ASTM D 638-72 |

All percentages are weight percent unless otherwise indicated.

EXAMPLE 1

This example demonstrates the formation of a flexible film which is then assembled into a marsh digester and which has good weather resistance. The following ingredients were charged into a Banbury mixer at 175° C.:
200 parts waste PVC
20 parts waste oil
55 parts predried red-mud The mix obtained was processed on a roll mill and then sheeted out on a calander. Films of 1.0 mm thickness were heat welded together to construct a cylindrical animal waste digester three meters long and 1.5 meters in diameter. The digester was buried with the cylindrical axis parallel to the ground surface with half the volume above ground. The digester was then filled with water to ground level and the air space above the water was pressurized to 15 cm water.

Over the course of one year, air has been pumped in and out of the digester for six thousand cycles with no damage to the surface of the digester. Air pressure was maintained over long periods of time. The film hardness was Shore A-77.

EXAMPLE 2

This example demonstrates the formation of a hard sheet which has good environmental resistance. The composition used was:
260 parts waste PVC
87 parts di-octyl phthalate (DOP)
527 parts predried red-mud
40 parts waste oil
40 parts sisal fiber These ingredients were mixed well and then put into a forming press under a pressure of 50kg/cm$^2$ at 170° C. for 5 minutes.

The sheet obtained had a bonding strength (ASTM D790-74) of 420kg/cm$^2$; after four years exposure to Taiwan's weather, the bending strength was 382kg/cm$^2$. A large portion of the bending strength has been retained after long environmental exposure. This is in contrast to the present state of the art where PVC becomes embrittled and useless in one to two years exposure to the out-of-doors environment.

The sisal fiber is an inexpensive reinforcing agent used to increase the tensile strength and hardness. The hardness was Shore D-78.

EXAMPLE 3

This example demonstrates the increase in tensile strength and the retention of elongation of materials of the present invention after prolonged exposure to ultraviolet light.

Table 3

| EXPERIMENT # | PVC % | RED-MUD % | WASTE OIL % |
|---|---|---|---|
| A | 78 | 12 | 10 |
| B | 100 | 0 | 0 |

It is noted that 100 hours of ultraviolet irradiation is equivalent to one year of out door testing.

Results are shown in FIGS. 1 and 2. As shown in the figures, addition of red-mud and waste lubricating oil pursuant to the present invention yields products which have better tensile strength and elongation after prolonged UV irradiation. All test results are the average of 5-10 samples according to the China National Standards Statistical procedures.

EXAMPLE 4

This example demonstrates the superiority of using red-mud pursuant to the present invention as compared to the use of conventional fillers, e.g. CaCO$_3$.

| EXPERIMENT # | PVC % | FILLER | PROCESSING AID |
|---|---|---|---|
| C | 160 g | CaCO$_3$ 60 g | Process Oil 60 g |
| D | 160 g | red-mud 60 g | Waste Oil 60 g |

As shown in FIGS. 3 and 4, the present invention gave improved elongation retention and retained tensile strength. This demonstrates a substantial improvement over prior art compositions.

EXAMPLES 5-7

The following examples demonstrate that the addition of waste lubricating oil as a processing aid does not adversely affect the initial physical properties of the compounded materials or the physical properties after aging tests. The composition consisted of 160 g PVC+160 g of di-octyl phthalate plus varying amounts of filler and processing aid. In the table below "FINAL" refers to 1000 hours UV irradiation.

Table 4

| EXAMPLE | RED-MUD | PROCESSING AID | ELONGATION | |
|---|---|---|---|---|
| | | | INITIAL | FINAL % |
| X (Control) | 60 g | 20 g Process Oil | 324 | 284 |
| 5 | 60 g | 20 g Waste Oil | 400 | 318 |
| 6 | 50 g | 30 g Waste Oil | 346 | 318 |
| 7 | 40 g | 40 g Waste Oil | 334 | 316 |

Table 4-continued

| | TENSILE STRENGTH KG/CM$^2$ | |
|---|---|---|
| X (Control) | 79.6 | 82.1 |
| 5 | 80.2 | 76.5 |
| 6 | 80.0 | 83.6 |
| 7 | 76.2 | 67.1 |

Having described the present invention, that which is sought to be protected is set forth in the following claims.

What is claimed is:

1. A polyvinylchloride composition having good tensile strength and retention of elasticity which comprises 20 to 85 weight percent polyvinylchloride and 5 to 80 weight percent red-mud.

2. The composition of claim 1 wherein said polyvinylchloride is waste polyvinylchloride.

3. The composition of claim 1 which further contains 3 to 15 weight percent of waste motor oil.

4. The composition of claim 1 which further contains 5 to 10 weight percent di-octyl phthalate.

5. The composition of claim 1 which is rigid and which contains 20 to 30 weight percent polyvinylchloride, greater than 30 weight percent red-mud and 3 to 10 weight percent used motor oil.

6. The composition of claim 1 which is a flexible film and which comprises 30 to 50 weight percent polyvinylchloride, 5 to 25 weight percent red-mud and 3 to 10 weight percent used motor oil.

7. The composition of claim 1 of which further contains a minor percentage of sisal as filler.

8. The composition of claim 1 in the form of a flexible sheet and containing 40 weight percent polyvinylchloride, 12 weight percent red-mud, 5 weight percent waste oil and 38 weight percent di-octyl phthalate.

9. The composition of claim 1 in the form of a rigid structure and containing 25 weight percent polyvinylchloride, 60 weight percent red-mud, 4 weight percent waste oil and 7 weight percent di-octyl phthalate.

10. The composition of claim 1 wherein said red mud is the sole stabilization agent for said polyvinylchloride.

* * * * *